US012677750B2

(12) United States Patent
Ricketts, II

(10) Patent No.: US 12,677,750 B2
(45) Date of Patent: Jul. 14, 2026

(54) SECONDARY CUTOFF CONFIGURATION FOR A CROSS-FLOW FAN

(71) Applicant: CNH Industrial America LLC, New Holland, PA (US)

(72) Inventor: Jonathan E. Ricketts, II, Coal Valley, IL (US)

(73) Assignee: CNH Industrial America LLC, New Holland, PA (US)

(*) Notice: Subject to any disclaimer, the term of this patent is extended or adjusted under 35 U.S.C. 154(b) by 397 days.

(21) Appl. No.: 18/273,653

(22) PCT Filed: Jan. 13, 2022

(86) PCT No.: PCT/US2022/012230
§ 371 (c)(1),
(2) Date: Jul. 21, 2023

(87) PCT Pub. No.: WO2022/159320
PCT Pub. Date: Jul. 28, 2022

(65) Prior Publication Data
US 2024/0099197 A1      Mar. 28, 2024

Related U.S. Application Data

(60) Provisional application No. 63/140,519, filed on Jan. 22, 2021.

(51) Int. Cl.
*A01F 12/44*          (2006.01)
(52) U.S. Cl.
CPC ............ *A01F 12/444* (2013.01); *A01F 12/44* (2013.01)
(58) Field of Classification Search
CPC ............................... A01F 12/444; A01F 12/44
See application file for complete search history.

(56) References Cited

U.S. PATENT DOCUMENTS 1,280,600 A * 10/1918 Wegner ................... A01F 12/44
                                                    209/318
1,481,436 A * 1/1924 Russell ................... A01F 12/44
                                                    460/59
(Continued)

FOREIGN PATENT DOCUMENTS

BE          1021153 B1      3/2016
CA          2146842 A1      11/1995
(Continued)

OTHER PUBLICATIONS

International Search Report and Written Opinion for PCT Application No. PCT/US2022/012230 dated Apr. 8, 2022 (12 pages).

*Primary Examiner* — Arpad Fabian-Kovacs
(74) *Attorney, Agent, or Firm* — CM Law PLLC; Stephen J. Weed

(57) ABSTRACT

A harvester cleaning fan system having a cross flow fan rotor, a fan inlet, a rotor shroud, a fan outlet and a cutoff wall assembly. The fan inlet extends in the fan rotation direction around a first portion of the cylindrical rotation volume. The rotor shroud is adjacent the fan inlet and extends in the rotation direction to enclose a second portion of the cylindrical rotation volume. The fan outlet is adjacent the rotor shroud. The cutoff wall assembly extends in the rotation direction by a cutoff wall distance to enclose a third portion of the cylindrical rotation volume. The cutoff wall assembly has a first cutoff wall and a second cutoff wall. The cutoff wall distance is about 40 mm to about 90 mm, and the fan has a rotation diameter of about 400 mm to about 500 mm.

22 Claims, 4 Drawing Sheets

(56) References Cited

U.S. PATENT DOCUMENTS

| 1,781,198 | A | * | 11/1930 | Scranton, Jr. | ........... | A01F 12/44 |
| | | | | | | 56/122 |
| 1,887,817 | A | * | 11/1932 | Messinger | ................ | A01F 7/00 |
| | | | | | | 460/97 |
| 2,272,148 | A | * | 2/1942 | Dray | ..................... | A01F 12/444 |
| | | | | | | 209/318 |
| 3,178,100 | A | | 4/1965 | Dätwyler | | |
| 3,533,413 | A | * | 10/1970 | Schenk | ................. | A01F 12/444 |
| | | | | | | 460/99 |
| 3,664,349 | A | * | 5/1972 | Quick | ................... | A01F 12/444 |
| | | | | | | 415/121.2 |
| 4,002,109 | A | * | 1/1977 | Hori | ........................ | F04D 17/04 |
| | | | | | | 415/53.3 |
| 4,078,870 | A | | 3/1978 | Keller et al. | | |
| 4,312,366 | A | * | 1/1982 | De Busscher | ......... | A01F 12/44 |
| | | | | | | 460/83 |
| 4,906,219 | A | * | 3/1990 | Matousek | ............. | A01F 12/444 |
| | | | | | | 415/203 |
| 5,197,850 | A | | 3/1993 | Shinobu et al. | | |
| 5,449,271 | A | | 9/1995 | Bushnell et al. | | |
| 8,052,374 | B2 | | 11/2011 | Ricketts | | |
| 8,221,064 | B2 | | 7/2012 | Ricketts et al. | | |
| 8,608,534 | B1 | | 12/2013 | Stahl et al. | | |
| 10,561,069 | B2 | * | 2/2020 | Thomas | ................. | A01F 12/444 |
| 10,849,276 | B2 | * | 12/2020 | Matousek | ............. | A01F 12/444 |
| 2014/0148229 | A1 | * | 5/2014 | Hillen | ................... | A01F 12/444 |
| | | | | | | 460/99 |
| 2016/0345500 | A1 | | 12/2016 | Duquesne et al. | | |
| 2018/0009305 | A1 | * | 1/2018 | Nelson | ................... | F02B 73/00 |
| 2020/0137959 | A1 | | 5/2020 | Ricketts | | |
| 2022/0279726 | A1 | * | 9/2022 | Ricketts | ................ | A01F 12/444 |

FOREIGN PATENT DOCUMENTS

| DE | 2545036 | A1 | | 4/1977 | | |
| GB | 2452240 | A | * | 3/2009 | ............. | A01F 12/48 |
| JP | 2001095361 | A | * | 4/2001 | ............. | A01F 12/44 |
| JP | 2006055023 | A | | 3/2006 | | |
| JP | 2018121569 | A | * | 8/2018 | ............. | A01F 12/44 |
| JP | 2020099221 | A | * | 7/2020 | ............. | A01F 12/32 |
| NL | 8004169 | A | | 1/1981 | | |

* cited by examiner

SECONDARY CUTOFF CONFIGURATION FOR A CROSS-FLOW FAN

FIELD OF THE INVENTION

This invention relates generally to a combine harvester cleaning systems, and, more particularly, to cleaning fan systems for use in harvester cleaning systems.

BACKGROUND OF THE INVENTION

As described in U.S. Pat. No. 9,462,752, which is incorporated by reference herein in its entirety, FIG. 1 depicts a representative combine harvester 100. The non-inventive aspects of combine harvesters 100 are of conventional, well-known construction and operation. The harvester 100 is representative of a wide variety of combine harvesters for grains such as, but not limited to, wheat and other grasses, corn, and legumes such as soybeans.

Generally, the harvester 100 is a self-propelled vehicle having a chassis 102 that is supported for movement on the ground by a plurality of wheels 104 (e.g., pneumatic tires, tracked wheels, etc.). At a forward end, the harvester 100 has a header 106 operable for severing plants from the ground as the harvester 100 is moved in the forward direction. The header 106 is configured and operable for gathering the cut crops and directing them into a feeder 108. The feeder 108 then conveys the cut crops to a threshing system 110 located generally within the harvester 100.

The harvester 100 also includes a cleaning system for carrying crop material from the threshing system 110, and separating grain from material other than grain ("MOG"). The cleaning system typically includes a cleaning fan 112 for generating and directing a flow of air upwardly and rearwardly over sieves 114. The sieves 114 allow grain to fall through, while preventing MOG of various sizes from passing. Augers 116 or other grain conveyors are located below the sieves 114 to collect grain. A grain pan 118 also may be provided to help direct grain from the threshing system 110 to the sieves 114.

The cleaning fan 112 typically is cross-flow fan, which receives air from an inlet region 120, and directs it to one or more outlet ducts 122. A cutoff 124 divides the outlet ducts 122 from the inlet region 120. Air passing through the outlet ducts 122 is delivered to sieves 114 to blow MOG from the grain.

In this example, the cleaning system has three sieves 114 in a sequential arrangement to perform successively finer separation of grain from MOG. Thus, the airflow from the cleaning fan 112 must be distributed to multiple locations by the system of outlet ducts 122. Each sieve 114 may require a different volume of air to operate in an ideal manner, and thus the outlet ducts 122 are designed to distribute the airflow, as best as possible, to each sieve 114. In some cases, the outlet ducts 122 also may include adjustable deflectors or dampers, to help modify the airflow distribution to address variations in grain properties or operating conditions.

As will be appreciated from the foregoing, the performance of the cleaning fan 112 itself has an effect on the operation of the rest of the cleaning system. An ongoing problem with existing cleaning fans 112 is evenly distributing the airflow across the width of the outlet ducts 122. Even distribution of airflow generally leads to more uniform cleaning across the width of the sieves 114, and greater cleaning efficiency. The problem of achieving uniform airflow distribution across the width is exacerbated by the nature of cross-flow fans, and efforts to make the cleaning system as wide as possible to accommodate greater volumes of incoming crop material.

This description of the background is provided to assist with an understanding of the following explanations of exemplary embodiments, and is not an admission that any or all of this background information is necessarily prior art.

SUMMARY OF THE INVENTION

In a first exemplary aspect, there is provided a harvester cleaning fan system having: a cross flow fan rotor configured to rotate about a fan axis in a rotation direction, the cross flow fan rotor having a plurality of vanes, each of the plurality of vanes extending a radial vane distance, in a radial direction away from the fan axis, from a respective proximal vane edge to a respective distal vane edge, the distal vane edges defining a cylindrical rotation volume having a rotation d; a fan inlet extending in the rotation direction around a first portion of the cylindrical rotation volume; a rotor shroud adjacent to the fan inlet and extending in the rotation direction to enclose a second portion of the cylindrical rotation volume; a fan outlet adjacent to the rotor shroud and configured to direct airflow away from the fan rotor; and a cutoff wall assembly spaced from the fan axis and extending in the rotation direction by a cutoff wall distance to enclose a third portion of the cylindrical rotation volume, the cutoff wall assembly comprising a first cutoff wall located adjacent to the cylindrical rotation volume at the fan outlet, and a second cutoff wall located adjacent to the cylindrical rotation volume at the fan inlet. The cutoff wall distance is about 40 mm to about 90 mm, and the fan has a rotation diameter of about 400 mm to about 500 mm, and preferably about 450 mm.

In some examples, the second cutoff wall is spaced from the cylindrical rotation volume by about 10 mm to about 15 mm.

In some examples, the first portion of the cylindrical rotation volume extends about 90° to about 100° about the rotation axis, and the third portion of the cylindrical rotation volume extends about 15° to about 25° about the rotation axis.

In some examples, the radial vane distance is about 60 mm to about 75 mm.

In some examples, the first portion of the cylindrical rotation volume extends about 90° to about 100° about the rotation axis, the third portion of the cylindrical rotation volume extends about 15° to about 25° about the rotation axis, and the radial vane distance is about 60 mm to about 75 mm.

In some examples, the fan outlet is in fluid communication with an outlet duct having minimum width (W) as measured in a plane perpendicular to the rotation axis of about 160 mm to about 200 mm.

In some examples, the fan outlet is in fluid communication with a divided outlet duct.

In some examples, the cutoff wall assembly further comprises a closure wall extending from the first cutoff wall adjacent to the cylindrical rotation volume to the second cutoff wall adjacent to the cylindrical rotation volume.

In some examples, the second cutoff wall comprises a plurality of openings therethrough.

In some examples, a majority of the second cutoff wall comprises a plurality of openings therethrough.

In some examples, substantially all of the second cutoff wall comprises a plurality of openings therethrough.

In some examples, the second cutoff wall comprises at least about 30% open area.

In another exemplary aspect, there is provided an agricultural vehicle having a chassis configured for movement along a surface, one or more sieves configured to separate grain from material other than grain, and a fan system as described in the foregoing aspects and examples.

BRIEF DESCRIPTION OF THE DRAWINGS

Embodiments of inventions will now be described, strictly by way of example, with reference to the accompanying drawings, in which.

In the figures, like reference numerals refer to the same or similar elements.

DETAILED DESCRIPTION OF THE DRAWINGS

Figure 1:
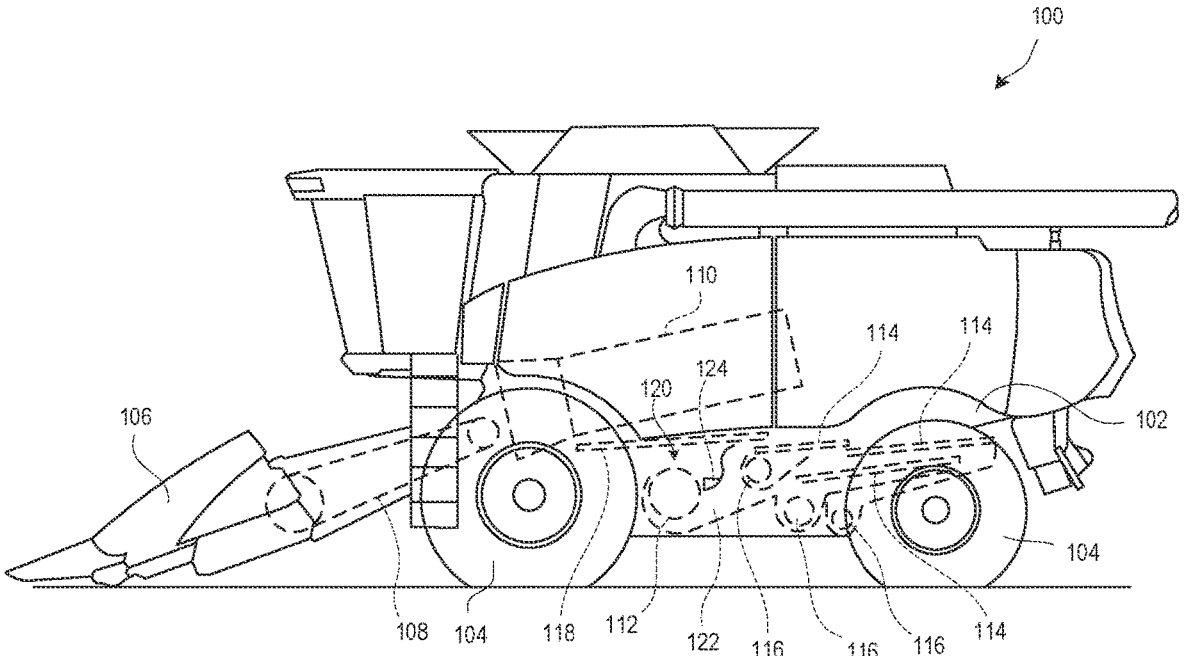
FIG. 1 illustrates a prior art agricultural harvester.

The drawing figures depict one or more implementations in accordance with the present concepts, by way of example only, not by way of limitations. The examples are shown in conjunction with an agricultural combine harvester, but have applicability in any similar agricultural vehicle.

The terms "crop material," "grain," and "MOG" are used in this specification principally for convenience, but it will be understood that these terms are not intended to be limiting. "Crop material" refers to the material removed from the ground and delivered to the cleaning system via the threshing system 110. "Grain" is that part of the crop material that is threshed and separated from the remainder of the crop material and kept for further processing, and the portion of the crop material that is left behind during the harvesting process is referred to as the material other than grain ("MOG").

The terms "forward," "rearward," "left," and "right," and the like, when used in connection with movable agricultural equipment such as an agricultural harvester and/or components thereof, are usually determined with reference to the normal direction of forward operative travel of the harvester; but, again, they should not be construed as limiting. The terms "longitudinal" and "transverse" are determined with reference to the fore-and-aft direction of the agricultural harvester and are equally not to be construed as limiting.

It has been found that it can be difficult to predictably develop a high-efficiency cleaning fan system for use in agricultural combine harvesters. Cross flow fans are typically used for this purpose, and such fans typically provide a somewhat uniform airflow distribution across the length of the fan (i.e., along the direction of the rotation axis). However, variations in airflow do exist, and, in the context of a combine harvester, such airflow variations can be detrimental to uniform and complete separation of grain from MOG. This problem is exacerbated by the facts that combine harvesters operate in varying environmental conditions, and the crop material can vary significantly in shape, size, texture, moisture content, density, and so on. In addition, the increasing width of modern harvesters creates greater disparity in the airflow pattern. Still further, cross flow fans can exhibit airflow variations in the direction perpendicular to the plane of the rotating axis, which leads to uneven or unpredictable airflow distribution between the passages of a divided outlet duct (e.g., an outlet duct that separates into multiple passages to feed different sieves). Still other problems are caused by fluctuations (variations over time) in the airflow, which can be caused by changes in atmospheric conditions, changes in backpressure at the outlet caused by crop material loading, and so on. Such factors, and others, make it very difficult to identify ideal cross flow fan parameters for use in combine harvesters.

Figure 3:
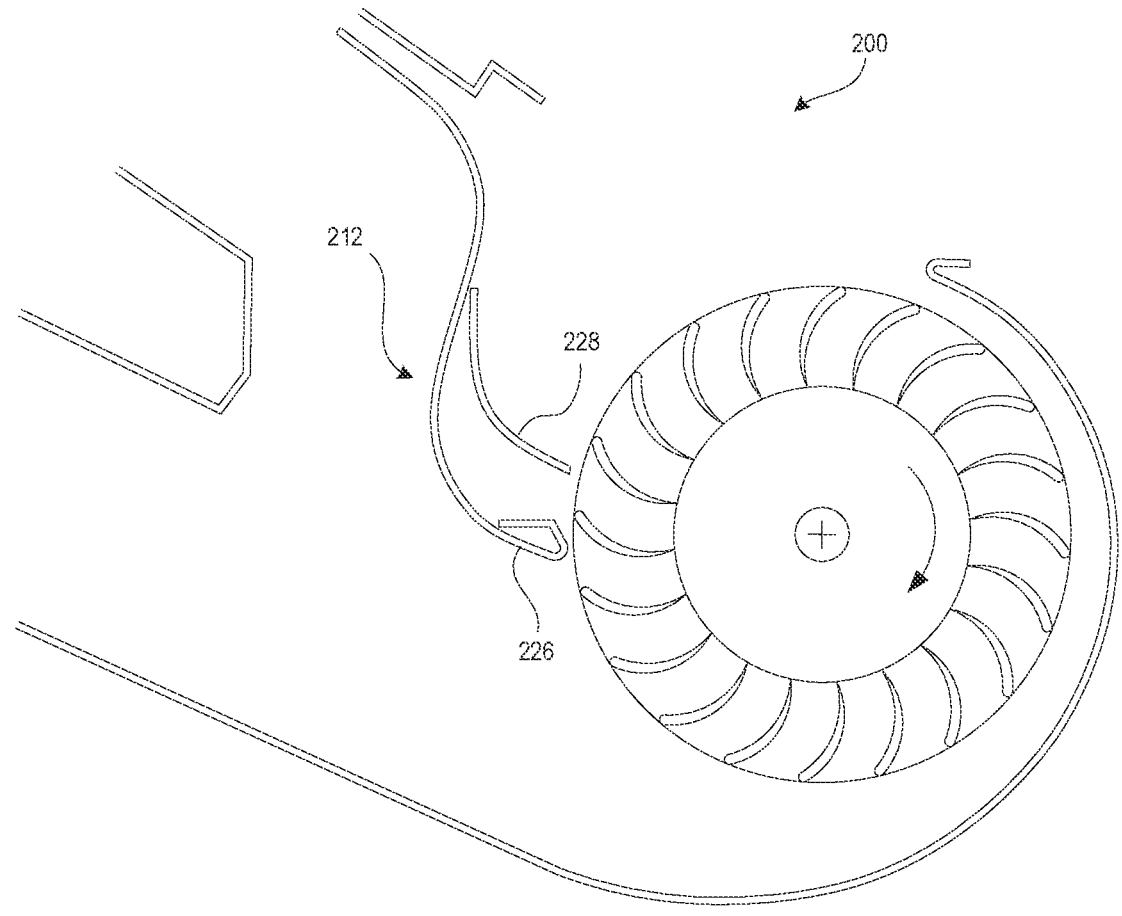
FIG. 3 illustrates a second example of a grain cleaning fan system.
Figure 4:
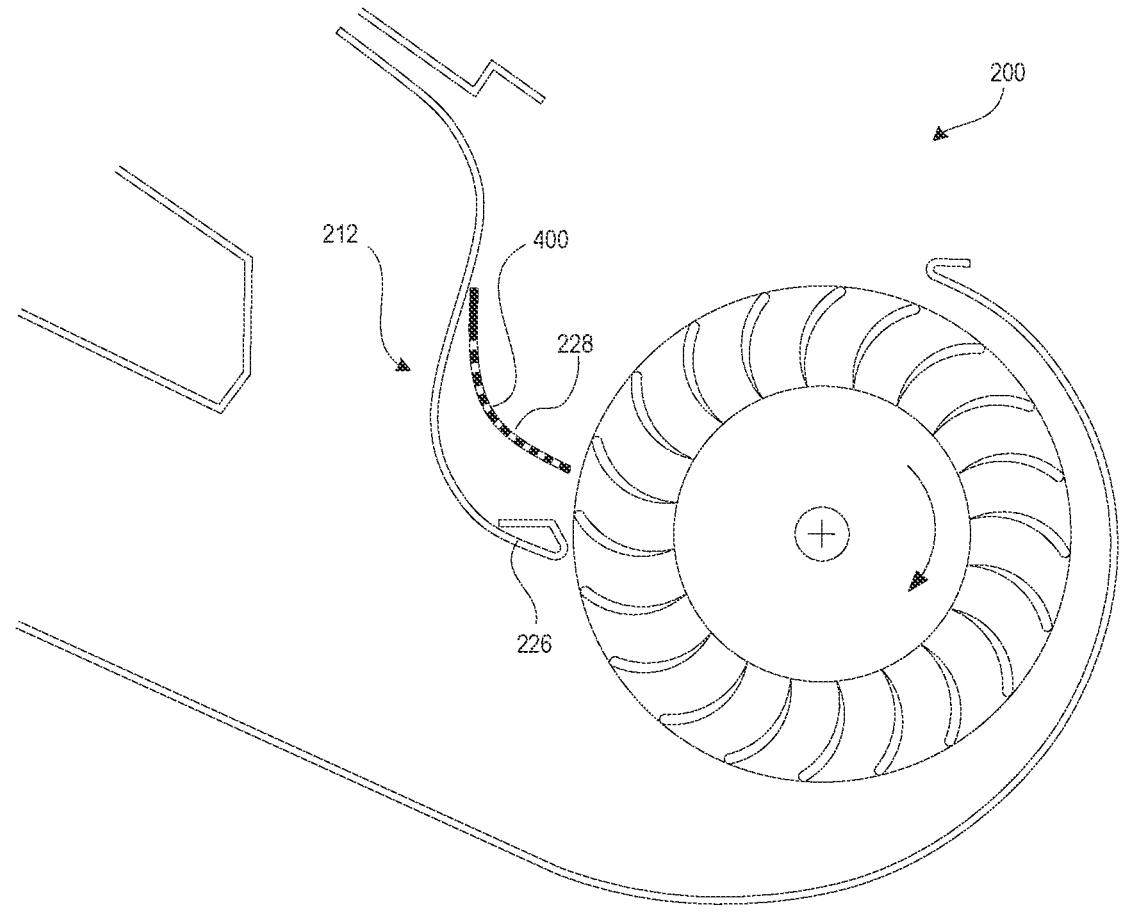
FIG. 4 illustrates a third example of a grain cleaning fan system.

Despite the foregoing difficulties, the inventors have determined that combine cleaning systems and obtain significant benefits in cleaning fan operation by using a cross flow fan having certain structural and dimensional features. Such structural and dimensional features may be applied, as one example, to the generally conventional combine harvester described above in relation to FIG. 1. Examples of such improved cleaning fan systems are shown in FIGS. 2-4.

Figure 2:
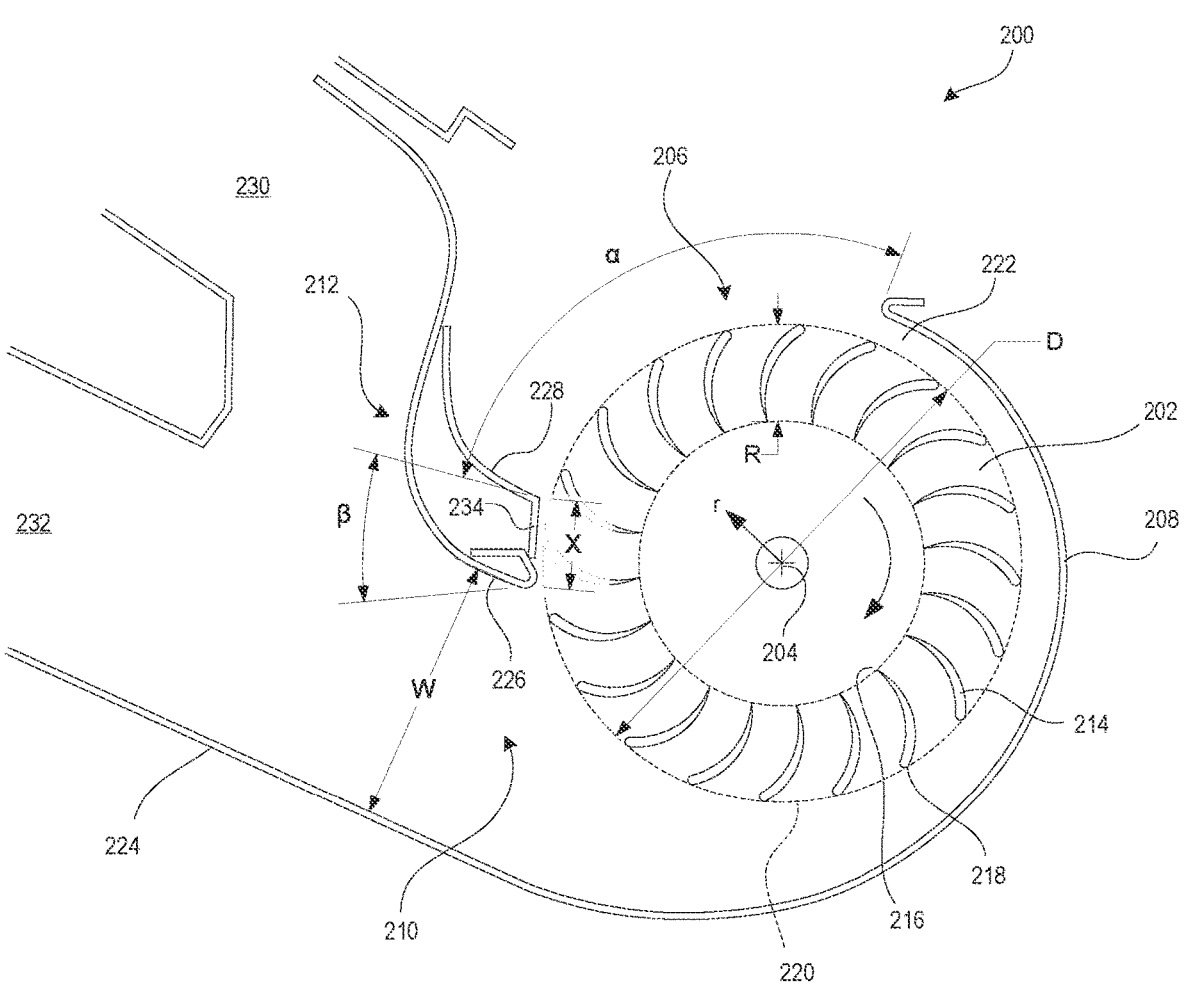
FIG. 2 illustrates a first example of a grain cleaning fan system.

Referring to FIG. 2, a first embodiment of an improved cleaning fan system 200 is illustrated in cross section. The cleaning fan system 200 generally includes a cross flow fan rotor 202 that is configured to rotate about a fan axis 204 in a rotation direction (curved arrow), a fan inlet 206, a rotor shroud 208, a fan outlet 210, and a cutoff wall assembly 212.

The fan rotor 202 has a plurality of vanes 214, each of which extends in a radial direction r away from the fan axis. Each vane 214 extends in the radial direction r from a respective proximal vane edge 216 to a respective distal vane edge 218. The distance between the proximal vane edge 216 and distal vane edge 218 along the radial direction is defined herein as the radial vane distance R. The distal vane edges 218 define a cylindrical rotation volume 220 and a fan rotation diameter D at their outermost path of travel in the radial direction r.

The fan inlet 206 extends in the rotation direction around a first portion of the cylindrical rotation volume 220, as defined by angle $\alpha$. The fan inlet 206 comprises an open area through which air can flow into the fan rotor 202. One or more air cleaning systems (e.g., screens, filters, etc.) may be placed upstream of the fan inlet 206, as known in the art.

The rotor shroud 208 is located adjacent to the fan inlet 206, at the downstream end of the fan inlet 206 with respect to the rotation direction. The rotor shroud 208 comprises a solid structure, such as bent sheet metal, that confines the air and directs the air to the fan outlet 210. The rotor shroud 208 extends in the rotation direction to enclose a second portion of the cylindrical rotation volume 220. The rotor shroud 208 is spaced in the radial direction r from the cylindrical rotation volume 220 by a gap 222. The gap 222 may increase in radial size as the rotor shroud 208 approaches the fan outlet 210, but this is not strictly required.

The fan outlet 210 is located adjacent to the rotor shroud 208, specifically at the downstream end of the rotor shroud 208 relative to the rotation direction. The fan outlet 210 is shaped to contain the airflow, and direct it away from the fan rotor 202 and towards a downstream outlet duct 224.

The cutoff wall assembly 212 is spaced in the radial direction r from the fan axis 204, and extends in the rotation direction to enclose a third portion of the cylindrical rotation volume 220. The cutoff wall assembly 212 includes a first cutoff wall 226 located adjacent to the cylindrical rotation volume 220 at the fan outlet 210, and a second cutoff wall 228 located adjacent to the cylindrical rotation volume 220 at the fan inlet 206.

The portion of the cylindrical rotation volume 220 enclosed by the cutoff wall assembly 212 is defined by a cutoff wall distance X that spans between the outer surfaces of the first cutoff wall 226 and the second cutoff wall 228.

The cutoff wall distance X is measured from those portions of the first and second cutoff walls 226, 228 having the most acute angle relative to the radial direction r (i.e., the angle closest to parallel with the radial direction r), at respective locations that are closest to the cylindrical rotation volume 220 (e.g., if two separate portions of the second cutoff wall 228 are oriented parallel to the radial direction r, the portion closest to the cylindrical rotation volume 220 is used to measure the cutoff wall distance X). In this example, the cutoff wall assembly 212 includes a closure wall 234 that extends from the first cutoff wall 226 adjacent to the cylindrical rotation volume 220 to the second cutoff wall 228 adjacent to the cylindrical rotation volume 220. The closure wall 234 prevents material from accumulating between the first and second cutoff walls 226, 228, and provides structural support to the cutoff wall assembly 212, but it is not strictly required.

It has been found that the size of the cutoff wall assembly 212 can be adjusted to improve the performance of the combine cleaning system. In particular, significantly improved airflow distribution and airflow stability, in both the direction of the fan axis 204 and in a plane perpendicular to the fan axis 204, has been obtained in a cleaning fan system 200 having a cutoff wall distance of about 60 mm to about 90 mm, and a fan rotation diameter D of about 400 mm to about 500 mm. In particularly beneficial examples, the cutoff wall distance is in the range of about 65 mm to about 85 mm, and the rotation diameter D is about 450 mm.

Other factors are also expect to affect and help account for the improved performance of the cleaning fan system 200. For example, in beneficial examples of the cleaning fan system 200, the second cutoff wall 228 is spaced from the cylindrical rotation volume 220 by about 10 mm to about 15 mm. As another example, in beneficial examples of the cleaning fan system 200, the fan inlet 206 extends around the cylindrical rotation volume 220 by a first angle α around the rotation axis 204 of about 90° to about 100°, and the cutoff wall assembly 212 extends around the cylindrical rotation volume 220 by a second angle R around the rotation axis 204 of about 15° to about 25°. As yet another example, in beneficial examples of the cleaning fan system 200, the radial vane distance R is about 60 mm to about 75 mm. Combinations of the foregoing parameters are expected to contribute to enhanced performance. For example, all of the preceding parametric values may be combined to provide enhanced performance. It is expected, however that certain variables will have less effect on the enhanced performance. For example, examples having a combination of the first angle α values, second angle R values and radial vane distances listed above are expected to provide benefits with relative independence of the distance between the second cutoff wall 228 and the cylindrical rotation volume 220.

Additional variables also may affect the performance of the cleaning fan system 200. In particular, the outlet duct 224 may have a minimum width W perpendicular to the flow direction (i.e., in a plane perpendicular to the fan axis 204) of about 160 mm to about 200 mm. For purposes herein, the minimum width W is the minimum dimension measured perpendicular to an interior wall portion of the outlet duct 224 that faces the first cutoff wall 226.

Improvements of the cleaning fan system 200 are expected to have particular utility in a combine harvester grain cleaning system, such as the one described in relation to FIG. 1 or other systems. Such improvements are expected to arise from more stable and even distribution of the airflow along the rotation axis 204, which provides more even and predictable cleaning across the width of the cleaning system sieves 114. Particular benefits also may be obtained in systems having a divided outlet duct 224, such as the outlet duct 224 shown in FIG. 2. Divided outlet ducts 224 direct airflow to multiple locations (typically to separate sieves 114), via separate outlet duct branches. In the shown example, there are two outlet duct branches: an upper branch 230 and a lower branch 232. Airflow division between the upper branch 230 and lower branch 232 is affected by variations in airflow across the width W of the outlet duct 224. Providing more stable and uniform distribution of airflow across the width W provides more predictable flow through the upper branch 230 and lower branch 232, leading to more consistent and efficient grain cleaning. Thus, the improved performance of the cutoff fan assembly 200 with regard to airflow distribution and consistency in the direction of a plane perpendicular to the rotation axis 204 (specifically, along the width W of the outlet duct 224) is expected to improve overall operation of the grain cleaning system.

Embodiments of a cleaning fan system 200 may also be modified to provide additional benefits or modifications that affect the airflow performance. For example, the second cutoff wall 228 may have a radiused or beveled end portion adjacent the cylindrical rotation volume and extending in the rotation direction or opposite the rotation direction. Other non-limiting examples of modifications are described in relation to FIGS. 3 and 4.

FIG. 3 shows another example of an cleaning fan system 200, in which the closure wall 234 is omitted. Embodiments having this construction have been found to provide improved airflow performance over embodiments having the closure wall 234.

FIG. 4 shows still another example of a cleaning fan system 200, in which the second cutoff wall 228 comprises a perforated wall having a plurality of openings 400 through it. The inclusion of openings 400 has been found to increase total air flow volume, at some cost to the uniformity of the airflow distribution. The openings 400 may have any size, number and location. For example, the openings 400 may be distributed throughout a majority of the second cutoff wall 228, or they may be distributed throughout substantially all of the second cutoff wall 228. In one example, the openings 400 are distributed throughout substantially all of the second cutoff wall 228, and are provided in the form of circular openings in 60° offset pattern to provide an open area (i.e. surface area removed by the presence of the openings 400) of at least about 30% of the total area (i.e., the area of the second cutoff wall 228 including the area occupied by the openings 400).

Cleaning fan systems 200 such as described herein may be provided in combine harvesters or other vehicles having a need to use fans to perform crop separation. Such cleaning fan systems 200 may be provided as replacement units, or as original equipment on a combine harvester. Existing cleaning fan systems 200 also may be modified by adding a second cutoff wall 228 in accordance with the teachings herein.

The present disclosure describes a number of inventive features and/or combinations of features that may be used alone or in combination with each other or in combination with other technologies. The embodiments described herein are all exemplary, and are not intended to limit the scope of the claims. It will also be appreciated that the inventions described herein can be modified and adapted in various ways, and all such modifications and adaptations are intended to be included in the scope of this disclosure and the appended claims.

The invention claimed is:

1. A harvester cleaning fan system comprising:
a cross flow fan rotor rotatable about a fan axis in a rotation direction, the cross flow fan rotor having a plurality of vanes, each of the plurality of vanes extending a radial vane distance, in a radial direction away from the fan axis, from a respective proximal vane edge to a respective distal vane edge, the distal vane edges defining a cylindrical rotation volume having a rotation diameter;
a fan inlet extending in the rotation direction around a first portion of the cylindrical rotation volume;
a rotor shroud adjacent to the fan inlet and extending in the rotation direction to enclose a second portion of the cylindrical rotation volume;
a fan outlet adjacent to the rotor shroud that directs airflow away from the fan rotor; and
a cutoff wall assembly spaced from the fan axis and extending in the rotation direction by a cutoff wall distance to enclose a third portion of the cylindrical rotation volume, the cutoff wall assembly comprising a first cutoff wall located adjacent to the cylindrical rotation volume at the fan outlet, and a second cutoff wall located adjacent to the cylindrical rotation volume at the fan inlet, wherein the second cutoff wall comprises plurality of openings therethrough;
wherein the cutoff wall distance is about 40 mm to about 90 mm, and the fan has a rotation diameter of about 400 mm to about 500 mm.

2. The harvester cleaning fan system of claim 1, wherein the second cutoff wall is spaced from the cylindrical rotation volume by about 10 mm to about 15 mm.

3. The harvester cleaning fan system of claim 1, wherein the first portion of the cylindrical rotation volume extends about 90° to about 100° about the rotation axis, and the third portion of the cylindrical rotation volume extends about 15° to about 25° about the rotation axis.

4. The harvester cleaning fan system of claim 1, wherein the radial vane distance is about 60 mm to about 75 mm.

5. The harvester cleaning fan system of claim 1, wherein the first portion of the cylindrical rotation volume extends about 90° to about 100° about the rotation axis, the third portion of the cylindrical rotation volume extends about 15° to about 25° about the rotation axis, and the radial vane distance is about 60 mm to about 75 mm.

6. The harvester cleaning fan system of claim 1, wherein the fan outlet is in fluid communication with an outlet duct having minimum width (W) as measured in a plane perpendicular to the rotation axis of about 160 mm to about 200 mm.

7. The harvester cleaning fan system of claim 1, wherein the fan outlet is in fluid communication with a divided outlet duct.

8. The harvester cleaning fan system of claim 1, wherein the cutoff wall assembly further comprises a closure wall extending from the first cutoff wall adjacent to the cylindrical rotation volume to the second cutoff wall adjacent to the cylindrical rotation volume.

9. The harvester cleaning fan system of claim 1, wherein a majority of the second cutoff wall comprises a plurality of openings therethrough.

10. The harvester cleaning fan system of claim 9, wherein substantially all of the second cutoff wall comprises a plurality of openings therethrough.

11. The harvester cleaning fan system of claim 1, wherein the second cutoff wall comprises at least about 30% open area.

12. An agricultural vehicle comprising:
a chassis enabling movement along a surface;
one or more sieves that separate grain from material other than grain; and a fan system comprising:
a cross flow fan rotor that rotates about a fan axis in a rotation direction, the cross flow fan rotor having a plurality of vanes, each of the plurality of vanes extending a radial vane distance, in a radial direction away from the fan axis, from a respective proximal vane edge to a respective distal vane edge, the distal vane edges defining a cylindrical rotation volume having a rotation diameter,
a fan inlet extending in the rotation direction around a first portion of the cylindrical rotation volume, a rotor shroud adjacent to the fan inlet and extending in the rotation direction to enclose a second portion of the cylindrical rotation volume, a fan outlet adjacent to the rotor shroud that directs airflow away from the fan rotor, and
a cutoff wall assembly spaced from the fan axis and extending in the rotation direction by a cutoff wall distance to enclose a third portion of the cylindrical rotation volume, the cutoff wall assembly comprising a first cutoff wall located adjacent to the cylindrical rotation volume at the fan outlet, and a second cutoff wall located adjacent to the cylindrical rotation volume at the fan inlet, wherein the second and cutoff wall comprises a plurality of openings therethrough,
wherein the cutoff wall distance is about 40 mm to about 90 mm, and the fan has a rotation diameter of about 400 mm to about 500 mm.

13. The agricultural vehicle of claim 12, wherein the second cutoff wall is spaced from the cylindrical rotation volume by about 10 mm to about 15 mm.

14. The agricultural vehicle of claim 12, wherein the first portion of the cylindrical rotation volume extends about 90° to about 100° about the rotation axis, and the third portion of the cylindrical rotation volume extends about 15° to about 25° about the rotation axis.

15. The agricultural vehicle of claim 12, wherein the radial vane distance is about 60 mm to about 75 mm.

16. The agricultural vehicle of claim 12, wherein the first portion of the cylindrical rotation volume extends about 90° to about 100° about the rotation axis, the third portion of the cylindrical rotation volume extends about 15° to about 25° about the rotation axis, and the radial vane distance is about 60 mm to about 75 mm.

17. The agricultural vehicle of claim 12, wherein the fan outlet is in fluid communication with an outlet duct having minimum width (W) as measured in a plane perpendicular to the rotation axis of about 160 mm to about 200 mm.

18. The agricultural vehicle of claim 12, wherein the fan outlet is in fluid communication with a divided outlet duct.

19. The agricultural vehicle of claim 12, wherein the cutoff wall assembly further comprises a closure wall extending from the first cutoff wall adjacent to the cylindrical rotation volume to the second cutoff wall adjacent to the cylindrical rotation volume.

20. The agricultural vehicle of claim 12, wherein a majority of the second cutoff wall comprises a plurality of openings therethrough.

21. The agricultural vehicle of claim 20, wherein substantially all of the second cutoff wall comprises a plurality of openings therethrough.

22. The agricultural vehicle of claim 20, wherein the second cutoff wall comprises at least about 30% open area.

\* \* \* \* \*